United States Patent [19]
Ohkubo

[11] Patent Number: 4,873,892
[45] Date of Patent: Oct. 17, 1989

[54] POWER TRANSFER DEVICE

[75] Inventor: Masahiro Ohkubo, Osaka, Japan

[73] Assignee: Kabushiki Kaisha Daikin Seisakusho, Neyagawa, Japan

[21] Appl. No.: 88,494

[22] Filed: Aug. 18, 1987

Related U.S. Application Data

[63] Continuation of Ser. No. 724,575, Apr. 18, 1985, abandoned.

[30] Foreign Application Priority Data

Apr. 18, 1984 [JP] Japan ................................. 59-77677
Apr. 18, 1984 [JP] Japan ................................. 59-77678

[51] Int. Cl.⁴ ............................................. F16H 1/44
[52] U.S. Cl. .................................... 74/710.5; 74/714; 180/249
[58] Field of Search ............. 74/710.5, 665 R, 665 F, 74/665 GA, 665 GC, 665 K, 714, 785, 695; 180/245, 247, 249, 250

[56] References Cited

U.S. PATENT DOCUMENTS

| | | | |
|---|---|---|---|
| 2,737,829 | 3/1956 | Wilson | 74/714 |
| 2,834,229 | 5/1958 | Graybill | 74/785 |
| 2,853,890 | 9/1958 | Kelbel | 180/248 |
| 2,913,929 | 11/1959 | Anderson | 74/710.5 |
| 3,031,900 | 5/1962 | Stump | 74/695 |
| 3,895,546 | 7/1975 | Yamaguchi et al. | 74/710.5 X |
| 3,908,775 | 9/1975 | von Fossen | 180/250 X |
| 3,915,267 | 10/1975 | Shea | 74/710.5 |
| 4,286,480 | 9/1981 | Dickie | 74/785 |
| 4,295,798 | 10/1981 | McIntosh | 74/710.5 X |
| 4,431,079 | 2/1984 | Suzuki | 180/247 X |

Primary Examiner—Dwight G. Diehl
Assistant Examiner—David Novais
Attorney, Agent, or Firm—Bradford E. Kile

[57] ABSTRACT

A power transfer device for a vehicle comprises a power input part; an intermediate gear mechanism having an intermediate input gear and an intermediate output gear meshing together; a first gear meshing with the intermediate input gear; a first shaft connected to the first gear; a second output part adapted to be connected to the intermediate output gear; a second shaft connected to the second output part; a first auxiliary output part connected to the first shaft; a dog clutch adapted to be switched between a differential operation position in which the intermediate output gear is connected only to the second output part and a differential non-operation position in which the intermediate output gear is connected to both of the first auxiliary output part and the second output part; a lock gear mechanism connected to the intermediate gear mechanism; and a lock mechanism adapted to disengagably connect the lock gear mechanism to a stationary part.

3 Claims, 3 Drawing Sheets

POWER TRANSFER DEVICE

This application is a continuation, of application Ser. No. 724,575, filed Apr. 18, 1985 now abandoned.

BACKGROUND AND SUMMARY OF THE INVENTION

The present invention relates to a power transfer device employed in a four-wheel drive vehicle such as a vehicle for construction, a wheel loader, a wheel crane and a jeep.

Conventionally, some of the such vehicles have employed sub-transmissions for compensating gear ratios of main transmissions and selector mechanisms for selecting four-wheel driving and two-wheel driving. Further, differential mechanisms are arranged for distributing power to front wheel axles and rear wheel axles. On a rough land, the vehicle can run in the four-wheel drive condition, and the sub-transmission is set in a low gear range. When tires may slip at a high gear range, the differential is set in a lock condition (non-operation condition). When the tires may not slip, the differential is set in an operation condition. In the high gear range, two-wheel driving can be performed to improve fuel consumption. As stated above, the above-mentioned vehicle has such an advantage that the driving conditions can be selected preferably in accordance with the running condition.

However, in the conventional device, said various mechanisms are arranged indipendently to each other, which results in such a disadvantage that the whole mechanisms have large and complicated structures and are expensive. Further, there is such a disadvantage in the conventional device that an operating mechanism is also complicated, and thus, manual operation can not be simple.

Accordingly, it is an object of the invention to provide an improved power transfer device, overcoming the above-noted disadvantages, wherein a differential mechanism can be used also as a transmission mechanism.

According to the invention, the power transfer device for a vehicle comprising a power input part; an intermediate gear mechanism having an intermediate input gear supported by the power input part and an intermediate output gear meshing with the intermediate input gear; a first output part forming a first output part and meshing with the intermediate input gear; a first shaft connected to the first gear; a second output part adapted to be connected to the intermediate output gear; a second shaft connected to the second output part; a first auxiliary output part connected to the first shaft; a dog clutch disposed among the intermediate output gear, the first auxiliary output part and the second output part and being adapted to be switched between a differential operation position in which the intermediate output gear is connected only to the second output part and a differential non-operation position in which the intermediate output gear is connected to both of the first auxiliary output part and the second output part; a lock gear mechanism connected to the intermediate gear mechanism; and a lock mechanism adapted to disengagably connect the lock gear mechanism to a stationary part.

Other and further objects, features and advantages of the invention will appear more fully from the following description of the preferred embodiments of the invention.

DETAILED DESCRIPTION OF THE PREFERRED EMBODIMENTS

Figure 1:
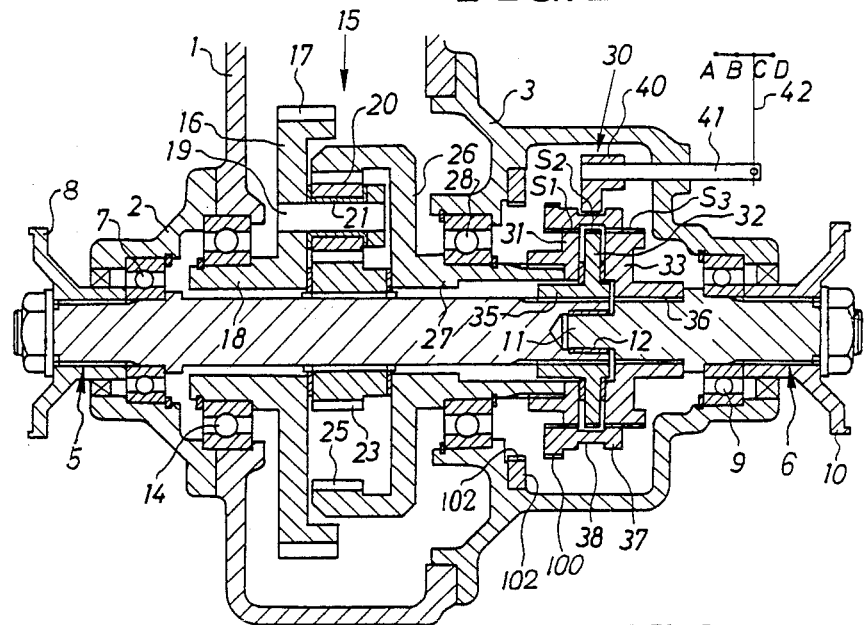
FIG. 1 is a fragmentary sectional view of a power transfer device of an embodiment of the invention.

Referring to FIG. 1, a housing assembly is formed by a housing 1 and covers 2 and 3 bolted to the front and rear ends thereof. Shafts 5 and 6, which extend in a longitudinal direction of a vehicle, for respectively driving front and rear wheels (not shown) are coaxially arranged in the housing assembly. The front drive shaft 5 (first shaft) extends from the interior of the cover 3 to a slightly forward position beyond the cover 2. A front portion of the shaft 5 is supported by a boss formed at a front end wall of the cover 2 through a bearing 7. A front end of the shaft 5 is connected through a joint 8 fixed thereto to a front wheel drive mechanism (not shown). The rear drive shaft 6 (second shaft) extends from the interior of the cover 3 to a slightly rearward position beyond the cover 3. the rear portion of the shaft 6 is supported by a boss formed at the rear end wall of the cover 3 through a bearing 9. The rear end of the shaft 6 is connected through a joint 10 fixed thereto to a rear wheel drive mechanism (not shown). The shaft 6 is provided at the front end thereof with a portion 11 of a small diameter, of which outer periphery is rotatably fitted through a bushing 12 to an inner periphery of a hole provided at the rear end of the shaft 5.

In the housing 1, a planetary gear mechanism 15 is provided around the shaft 5. An annular carrier 16 of the planetary gear mechanism 15 is provided at its periphery with a gear 17 (input part), which meshes with an output gear (not shown) of a transmission. The carrier 16 is provided at the inner peripheral portion with a cylindrical boss 18 projecting forwardly. The outer periphery of the boss 18 is supported through a bearing 14 by an annular boss at the front end of the housing 1. A plurality of pins 19 projecting rearwardly are fixed to circumferential spaced portions of the carrier 16. Planetary gears 20 (intermediate input gear) are supported through bushings 21 by the pins 21, respectively. A sun gear 23 (first gear: first output part) meshing with the gears 20 is splined to the outer periphery of the shaft 5. An internal ring gear 25 (intermediate output gear) meshing with the gears 20 is integrally provided with a radially inward annular portion 26 adjacent to the cover 3. A cylindrical portion 27 is projected from the inner periphery of the annular portion 26 into the cover 3. The outer periphery of the portion 27 is supported through a bearing 28 by an inner peripheral boss at the front end of the cover 3.

A dog clutch 30 is arranged at the near of the rear end of the cylindrical portion 27. The dog clutch mechanism includes an input part 31 a first auxiliary output 32, and a second output part 33 which are annular or cylindrical and are axially aligned with bushings therebetween. The input part 31 is splined and fixed to the outer periphery of the rear end of the cylindrical portion 27. The output part 32 (first auxiliary part) is provided with a forwardly projecting cylindrical boss 35, which is splined and fixed to the outer periphery of the rear end of the shaft 5. The output part 33 (second output part) is provided with a rearwardly projecting cylindrical boss 33, which is splined and fixed to the outer periphery of the front end of the shaft 6.

The input and output part 31, 32 and 33 are provided also at the outer peripheries with splines s1, s2 and s3, respectively, around which a cylindrical connecting part 37 having an internal spline is disposed. The spline of the connecting part 37 is adapted to selectively engage with the splines s1, s2 and s3 in accordance with the axial position of the connecting part 37. The connecting part 37 is provided at the outer periphery with an annular groove 38, into which a shift fork 40 is engaged. The fork 40 is fixed to a front end of a shift rod 41 parallel to the shaft 6. The shift rod 41 is slidably supported at the intermediate portion thereof by a hole at the cover 3. The rear end of the rod 41 projecting beyond the cover 3 is connected to an operation lever 42 through a link mechanism (not shown) or the like. The lever 42 is designed to be selectively switched to any of positions A, B, C and D.

The connecting part 37 is provided at the outer periphery of the front end thereof with an outer spline 100. At the near of the bearing 28, an annular member 101 is fixed to the inner surface of the cover 3. An internal spline 102 meshable with the spline 100 is formed at the inner periphery of the member 101.

An operation is as follows. A power of an engine (not shown) is transmitted through a main transmission (not shown) to the carrier 16, and thus, the gears 20 always revolve together with the carrier 16 around the shaft 5. And according to the above structures, various driving conditions can be set as follows.

(1) Low Speed; Four Wheel Drive; Differential Operated; Lever Position: C

In this condition, the connecting part 37 connects the input part 31 only with the output part 33, as illustrated, so that the gear 25 is connected only to the shaft 6. Thus, when the vehicle runs straightly and front and rear tires rotate at a same speed, the front wheel drive gear 23, the rear wheel drive gear 25 and the carrier 16 rotate as one unit. When the vehicle is steered and the front and rear tires start to rotate at different speeds, the front wheel drive gear 23 and the rear wheel drive gear 25, which mesh with the planetary gears 20 on the carrier 16, start to rotate at approriately different speeds. Thus, the differential gear mechanism 15 performs the differential operation.

(2) Low Speed; Four Wheel Drive; Differential Non-operated (Locked); Lever Position: D In this condition, the connecting part 37 is moved to connect the input part 31 with both output parts 32 and 33, so that the shafts 5 and 6 are connected together, and the gear 25 is connected to the shafts 5 and 6. Thus, the gears 20 revolve together with the carrier 16 without rotating around the pins 19, and the rotating power transmitted from the carrier 16 through the pins 19 to the gears 20 is transmitted through the gears 23 and 25 to the shafts 5 and 6.

(3) High Speed; Two Wheel Drive; Lever Position: A

In this condition, the spline 100 meshes with the spline 102. The internal spline of the conecting part 37 meshes only with the spline s1 of the input part 31, so that the stationary member 101 prevents the rotation of the gear 25 through the connecting part 37 and the input part 31. Thus, the gears 20 meshing with the gear 25 revolve together with the carrier 16 and rotate around the pins 19. Therefore, the gears 20 drive the gear 23 at a speed higher than that at the four wheel driving, and the rotation speed of the shaft 5 increases. The power is not transmitted to the shaft 6.

(4) Neutral Range; Lever Position: B

In this condition, the spline 100 does not mesh with the spline 102. The internal spline of the connecting part 37 meshes only with the spline s2 of the output part 32. Therefore, the gear 25 can freely rotate with respect to the gears 20, and thus, the gears 20 can not drive the gears 23 and 25.

According to the invention, as described hereinbefore, the dog clutch 30 is associated with the differential mechanism consisting of, e.g., the planetary gear mechanism 15, and the clutch 30 is designed to control the connecting conditions of the gear 25, so that the differential gear mechanism may be utilized also as a speed changer. Therefore, the whole structures can be small, simple and inexpensive. Further, the operation mechanism (lever 42) has a simple structure, and the manual operation thereof can be simple.

Particularly, in the illustrated embodiment, since the clutch 30 can be utilized to form the two wheel drive range and the neutral range, the power transfer device in which the various driving conditions can be selected can be constructed in the simple structures.

The present invention may be modified as follows.

Figure 2:
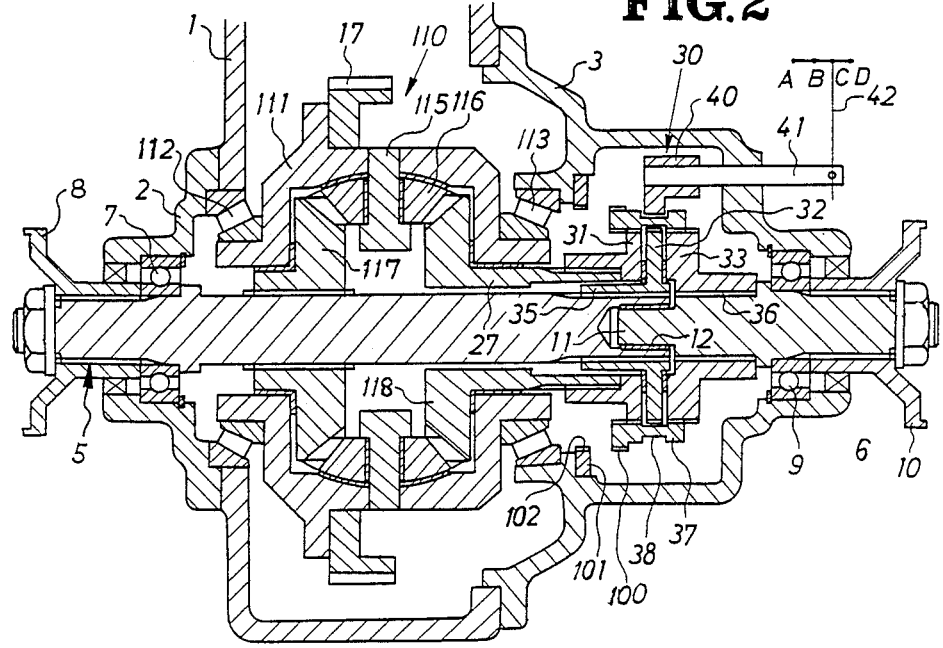
FIG. 2 is a fragmentary sectional view of a power transfer device of other embodiment of the invention.
Figure 3:
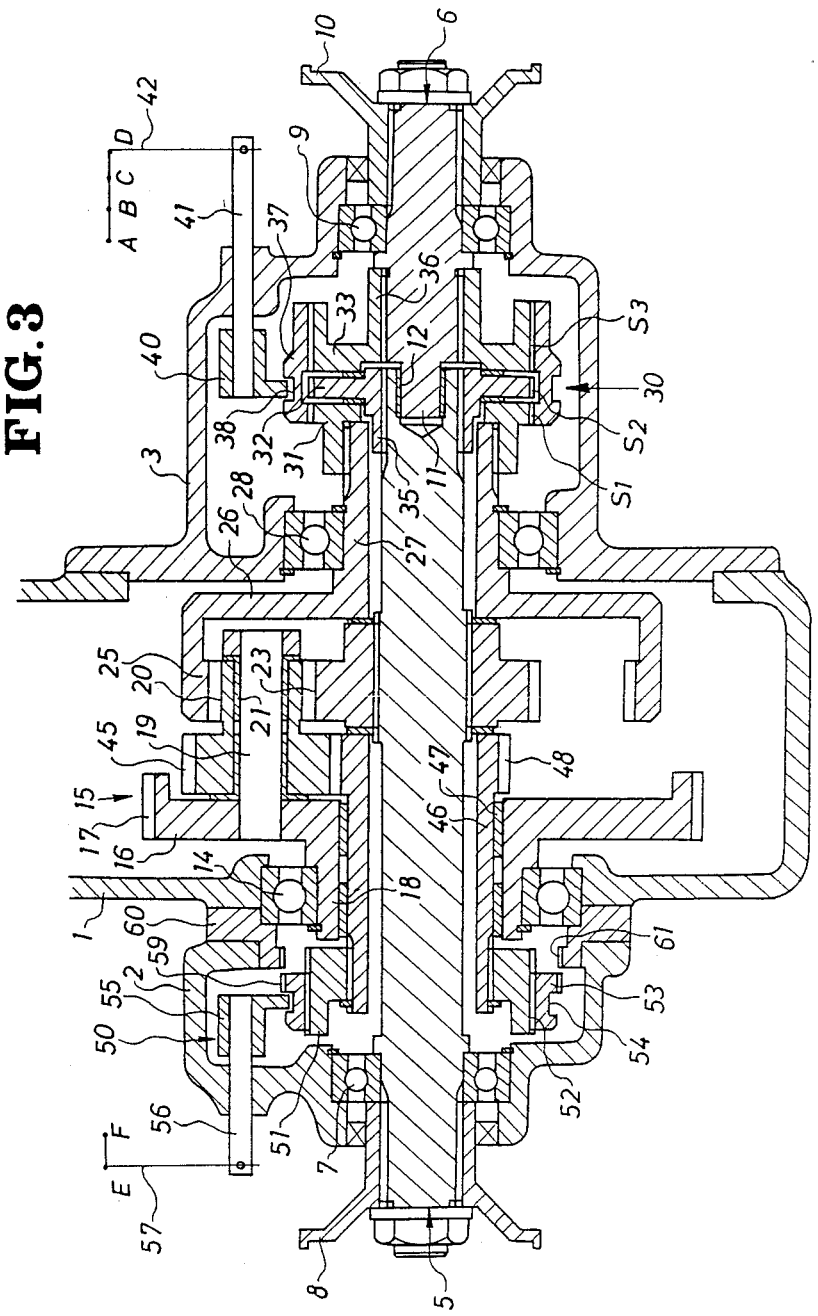
FIG. 3 is a fragmentary sectional view of a power transfer device of another embodiment of the invention.
Figure 4:
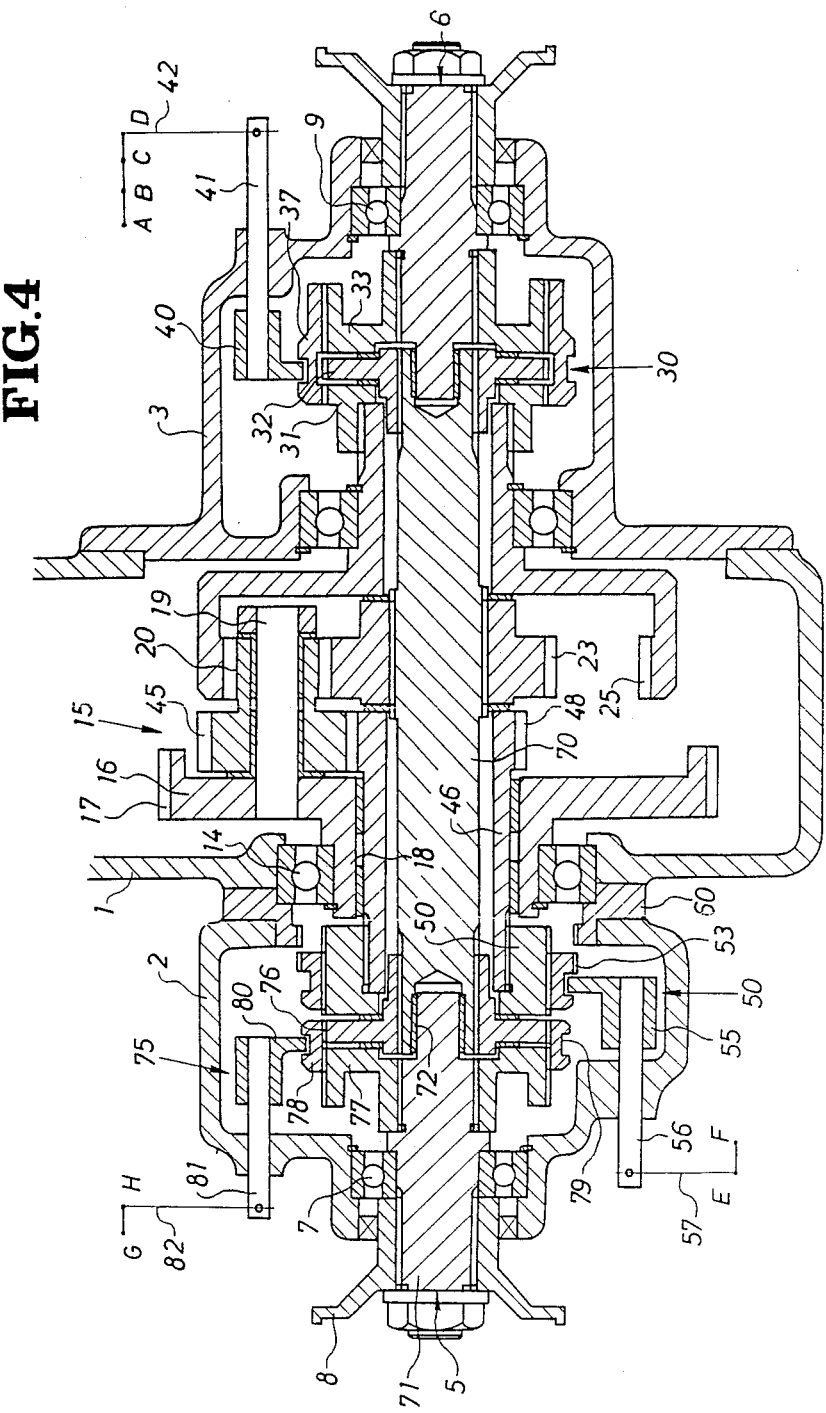
FIG. 4 is a fragmentary sectional view of a power transfer device of still another embodiment of the invention.

Referring to FIGS. 2, 3 and 4, in which respectively different embodiments are illustrated, same members and parts as those in FIG. 1 bear same reference numbers, and only structures and operations different from those of the embodiment in FIG. 1 are described hereinafter.

In the embodiment in FIG. 2, a differential mechanism 110 including bevel gears (116, 117 and 118) is employed. A differential housing 111 of the differential mechanism 110 is provided at both ends with cylindrical bosses which are supported through bearings 112 and 113 by the cover 2 and 3. The input gear 17 is fixed to the housing 111. Spider rods 115 projecting toward the shaft 5 are fixed to circumferentially spaced portions of the housing 111. Pinion gears 116 are supported by the spider rods 115. The gears 116 mesh with side gears 117 and 118 arranged at both sides of the gears 116. The gear 117 is splined and fixed at its inner periphery to the shaft 5. The gear 118 is provided with a cylindrical boss 27 which is connected to the dog clutch 30, similarly to those in FIG. 1. The gears 117 and 118 is supported by the housing 111 through bushings.

In this embodiment, the housing 111 operates similarly to the carrier 16 in FIG. 1. The gears 116, 117 and 118 operates similarly to the gears 20, 23 and 25 in FIG. 1, respectively. Therefore, similar operation and effect to those by the embodiment in FIG. 1 can be obtained.

In both of said embodiments, although the dog clutch 30 is designed to be operated by one lever, the clutch 30 may be designed to be operated by two levers.

In the embodiment in FIG. 3, the lock mechanism (100, 101 and 102) in FIG. 1 is eliminated, and following mechanisms are added.

The gears 20 are integrally provided with gears 45 (lock input gear) of a large diameter, respectively. Each gear 45 is positioned between the gear 20 and the carrier 16, and is supported at the inner periphery thereof by the pin 19 through the bushing. The gears 45 mesh with a gear 48 (lock output gear) of a small diameter and provided at a rear end of a cylindrical shaft 46. The shaft 46 is supported through a bushing 47 by the inner periphery of the boss 18, and is projected forwardly beyond the boss 18. The projected front end of the shaft 46 is provided at the outer periphery with a spline to which an internal spline of an annular braked member 51 of a dog clutch 50 is rigidly splined.

The member 51 is provided at the outer periphery with a spline 52, to which a cylindrical connecting part 53 of the dog clutch 50 is slidably engaged. The connecting part 53 is provided at the outer periphery with an annular groove 54 into which a shift fork 55 is fitted. The fork 55 is fixed to a rear end of a shift rod 56 parallel to the shaft 5. The shift rod 56 is supported at the intermediate portion thereof in a hole of the cover 2, and is connected at the end projecting beyond the cover 2 to an operation lever 57 through a link mechanism (not shown). The lever 57 is designed to be selectively set in a position E or F. The connecting part 53 is provided at the outer periphery of the rear end thereof with an external spline 59 which is adapted to mesh with an internal spline 61 of an annular stationary member 60. The stationary member 61 is positioned between the housing 1 and the cover 2 and is bolted thereto.

According to the structures in FIG. 3, various driving conditions can be set as follows.

(1) Low Speed; Four Wheel Drive; Differential Non-Operated (Locked); Lever Positions: C and F In this condition, the connecting member 53 is moved by the fork 55 to mesh with the spline 61, so that the stationary member 60 prevents the rotation of the shaft 46 through the connecting part 53 and the member 51, and thus, the gear 48 of the shaft 46 does not rotates. Whereby, the rotation of the gears 45 meshing with the gear 48 is restricted and the gear 23 connected to the shaft 5 rotates at a lower speed in accordance with the difference between the gear ratio of the gear 45 and the gear 48 meshing therewith and the gear ratio of the gear 20 and the gear 23 meshing therewith. The connecting part 37 is moved by the shift fork 40 to disengage from the spline s1 of the input part 31 and engage the splines s2 and s3 of the output parts 32 and 33 together. Thus, the input part 31 can freely rotate and permits the free rotation of the gear 25. In this condition, the rotation power transmitted from the gear 23 to the shaft 5 is also transmitted from the output part 32 through the connecting part 37 and the output part 33 to the shaft 6, The planetary gear mechanism 15 does not function as the differential means.

(2) High Speed; Four Wheel Drive; Differential Non-Operated Lever Positions: B and E In this condition, the connecting part 53 disengages from the stationary member 60, so that the shaft 46 can freely rotate, and the gear 48 does not apply a resistance to the rotation of the gears 45. The connecting part 37 is moved to connect the input part 31 to both output parts 32 and 33, so that the shafts 5 and 6 are rigidly connected together, and the gear 25 is also rigidly connected to the shaft 6. Thus, the gears 20 revolve together with the carriers 16 without rotating around the pins 19, and the rotation power transmitted from the carrier 16 through the pines 19 to the gears 20 is transmitted from the gears 23 and 25 to the shafts 5 and 6.

(3) High Speed; Four Wheel Drive; Differential Operated; Lever Positions: D and E Also in this condition, since the connecting part 53 disengages from the stationary member 60, the gear 48 does not apply the resistance to the rotation of the gears 45. The connecting part 37 connects the input part 31 to the output part 33, as illustrated, and the gear 25 is connected only to the shaft 6. Thus, when the vehicle runs straightly and the rotation speeds of the front tires and rear tires are same, the gears 23, 25 and the carrier 16 rotate as one unit, because the rotation speeds of the shafts 5 and 6 are same. When the vehicle is steered and the front and rear tires start to rotate at different speeds, the planetary gears 20 on the carrier 16 of the input part functions to rotate the front wheel drive gear 23 and the rear wheel drive gear 25 at different speeds. Thus, the planetary gear mechanism 15 operates as the differential means.

(4) High Speed; Two Wheel Drive; Lever Position: A and E

In this condition, since the connecting part 53 disengages from the stationary member 60, the gear 48 does not apply the resistance to the rotation of the gears 45. The connecting part 37 connect the input part 31 only to the output part 32, and the gear 25 is connected only to the shaft 5. Thus, the gear 20 drives only the shaft 5 through the gears 23 and 25, so that the shaft 5 rotates at the same speed as the carrier 16. The power is not transmitted to the shaft 6.

According to the above structures, the planetary gear mechanism 15 is disposed around the shaft 5, and the dog clutch 30 and the dog clutch 50 (lock mechanism) are employed to control the operating conditions of the planetary gear mechanism 15 and the connecting condition of the shafts 5 and 6, so that the planetary gear mechanism 15 may be used also as a selectable (disengagable) differential means and speed changer means. Further, the dog clutch 30 is utilized not only as a controlling means for the connecting conditions of the gear 25 but also as the disengaging means for the shaft 6. Therefore, according to the invention, the transfer device in which various driving conditions can be selected can have simple structures and be manufactured inexpensively.

In the embodiment in FIG. 4, the shaft 5 is divided at a portion projected beyond the shaft 46 into two coaxial shaft parts 70 and 71. The shaft part 70 (first input shaft part) is provided at an end portion projected from the shaft 46 with a central hole into which an end of a small diameter of the shaft part 71 (first output shaft part) is fitted through a bushing 72.

A dog clutch 75 is arranged around the adjacent ends of the shaft parts 70 and 71. The dog clutch 75 is provided with a pair of annular members 76 and 77 splined to the outer peripheries of the ends of the shaft parts 70 and 71, respectively. A cylindrical connecting part 78 is splined to splines at the outer peripheries of the members 76 and 77. The connecting part 78 is provided at the outer periphery with an annular groove 79 into which a fork 80 is fitted. The fork 80 is fixed to an end of a rod 81. Other end of the rod 81 is connected to a lever 82 which is selectable between two positions G and H.

According to above structures, when the lever 82 is set at the position H, as illustrated, the connecting member 78 connects the members 76 and 77 together, and the shaft parts 70 and 71 are rigidly connected together. Therefore, in this condition, various driving conditions can be performed similarly to the embodiment in FIG. 3 by selecting the levers 42 and 57.

When the lever 82 is switched to the position G, the connecting part 78 moved by the fork 80 disengages from the member 76. Thus, the shaft part 71 disengages from the shaft part 70 and the rotation power is not transmitted to the shaft part 71. In this condition, when the levers 42 and 57 are set at the positions D and F, respectively, the driving condition of the high speed and two wheel drive can be set. Namely, the lever 42 at the position D functions to connect the input part 31 only to the output part 33. The lever 57 at the position F functions to unrotatably fix the shaft 46, so that the gears 20 and the gears 45 meshing with the gear 48 rotate around the pins 19, and thus, the gear 25 is driven not only by the revolution of the gears 20 but also by the rotation of the gears 20. Therefore, the gear 25 is driven at a speed faster than that in the high speed driving of the embodiment in FIG. 3, and only the shaft 6 is driven at the very high speed.

When the levers 42, 57 and 82 are set at the positions B, E and G, a driving condition of middle speed (corresponding to the high speed at the embodiment in FIG. 3) and two wheel drive can be performed. Namely, at the position E, since the connecting part 53 disengages from the stationary member 60, the shaft 46 can freely rotates and the gear 48 does not apply the resistance to the rotation of the gear 45. At the position B, the connecting part 37 connects the input part 31 and the output parts 32 and 33 together, so that the shaft 6 is rigidly connected to the shaft part 70 and the gear 25 is rigidly connected to the shaft 6. Therefore, the gears 20 do not rotate around the pins 19 and revolve together with the carriers 16, so that the rotation power transmitted from the carriers 16 through the pins 19 to the gears 20 is transmitted through the gears 23 and 25 to the shaft 6 and the shaft part 70. And, in the position G, the shaft part 71 is disengaged from the shaft part 70, so that the power transmitted to the shaft part 70 is not transmitted to the shaft part 71. Therefore, only the shaft 6 is driven at the middly speed.

In the embodiments in FIGS. 3 and 4, the planetary gear 45 and the sun gear 48 (external tooth gear) meshing with each other have different numbers of teeth, and the gear 48 is employed to selectively fix and release the gear 45 so as to change the rotation speed of the gear 20. However, instead of this structure, the gear 45 may be meshed with an internal tooth ring gear having different number of the teeth from that of the gear 45, and the internal tooth ring gear may be utilized to restrict the rotation of the gears 45 and 20.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed is:

1. A power transfer device for a vehicle comprising:
   a power input part;
   an intermediate gear mechanism including three members,
      an intermediate input gear supported by said power input part in a driving relation;
      an intermediate output gear meshing with said intermediate input gear and
      a first gear (23) meshing with said intermediate input gear (20);
   a first shaft being in meshing engagement and fixedly connected to said first gear of said intermediate gear mechanism;
   a second shaft coaxially and rotatably journaled to said first shaft, forming a joint portion;
   a stationary member mounted on a stationary portion of the vehicle;
   a dog clutch mechanism housed at said joint portion of said first shaft and said second shaft and having a lock gear mechanism for selectively controlling the connection of said intermediate output gear with said first shaft, said second shaft and said stationary member; and
   a control mechanism connected to said dog clutch mechanism,
   wherein, said dog clutch mechanism comprises:
   an input part which is mounted at a peripheral portion of said first shaft and is connected to said intermediate output gear
   a second output part which is in meshing engagement and fixedly connected to said second shaft;
   a first auxiliary output part which is in meshing engagement and fixedly connected to said first shaft and is housed between said input part and said second output part;
   said dog clutch mechanism is selectively connectable to said stationary member, said input part, said second output part and said first auxiliary output part and includes said lock gear mechanism which can be actuated by said control mechanism for selectively connecting said lock gear mechanism with said stationary member, said input part, said second output part and said first auxilliary output part.

2. A power transfer device for a vehicle as defined in claim 1, wherein said lock gear mechanism comprises:
   a movable connecting part which can be switched by said control mechanism for selectively providing connection of said movable connecting part with said input part, said first auxiliary output part, said second output part and said stationary member.

3. A power transfer device for a vehicle as defined in claims 1 or 2 wherein:
   said dog clutch mechanism is adapted to be operated in a differential operation condition in which said intermediate output gear is connected to said second shaft under the engagement of said movable connecting member of said dog clutch with said input part and said second output part;
   said dog clutch mechanism also is adapted to be operated in a non-differential operation condition in which said intermediate output gear is connected to both said first shaft and said second shaft under the engagement of said movable connecting member of said dog clutch with said input part, said first auxiliary output part and said second output part;
   said dog clutch mechanism is adapted to be operated in a condition in which said intermediate output gear is connected neither to said second shaft nor said first shaft and is stationary under the engagement of said movable connecting member of said dog clutch with said stationary member and said input part;

said dog clutch mechanism is also adapted to be operated in a neutral condition in which said intermediate output gear is connected to neither said second shaft nor said first shaft, and can rotate freely under the disengagement of said movable member of said dog clutch mechanism with said input part; associated with the operation of said dog clutch mechanism, said intermediate gear mechanism acts as a differential gear as well as a speed change gear.

* * * * *